(12) United States Patent
Fraenkel et al.

(10) Patent No.: US 8,468,530 B2
(45) Date of Patent: Jun. 18, 2013

(54) DETERMINING AND DESCRIBING AVAILABLE RESOURCES AND CAPABILITIES TO MATCH JOBS TO ENDPOINTS

(75) Inventors: Michael L. Fraenkel, Cary, NC (US); Richard E. Nesbitt, Holly Springs, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1793 days.

(21) Appl. No.: 10/907,596

(22) Filed: Apr. 7, 2005

(65) Prior Publication Data

US 2006/0230405 A1    Oct. 12, 2006

(51) Int. Cl.
*G06F 9/46* (2006.01)

(52) U.S. Cl.
USPC ............................................. 718/102; 718/104

(58) Field of Classification Search
USPC .................. 718/105, 102–104; 709/201–203
See application file for complete search history.

(56) References Cited

U.S. PATENT DOCUMENTS

| 5,093,794 | A | * | 3/1992 | Howie et al. ................... 700/100 |
| 5,592,679 | A | * | 1/1997 | Yung ............................... 712/23 |
| 6,311,219 | B1 | | 10/2001 | Factor |
| 6,678,889 | B1 | | 1/2004 | Burkett et al. |
| 7,383,550 | B2 | * | 6/2008 | Challenger et al. ........... 719/315 |
| 7,590,709 | B2 | * | 9/2009 | Kikuchi ......................... 709/219 |
| 7,596,788 | B1 | * | 9/2009 | Shpigelman ................... 718/100 |
| 2002/0133591 | A1 | | 9/2002 | Makarios et al. |
| 2003/0074402 | A1 | | 4/2003 | Stringer-Calvert et al. |
| 2003/0177160 | A1 | | 9/2003 | Chiu et al. |
| 2004/0083289 | A1 | | 4/2004 | Karger et al. |
| 2005/0071843 | A1 | * | 3/2005 | Guo et al. ...................... 718/101 |
| 2005/0149940 | A1 | * | 7/2005 | Calinescu et al. ............. 718/104 |

OTHER PUBLICATIONS

Jang-uk in, Paul Avery, Richard Cavanaugh, Sanjay Ranka, Policy Based Scheduling for Simple Quality of Service in Grid Computing, Apr. 2004 Proceedings of the 18th International Parallel and Distributed Processing Symposium (IPDPS'04).*
Quecke et al, "Mesch—An Approach to Resource Management in a Distributed Environment", Spriger-Verlag, 2000, pp. 47-54.*
Chris Smith, "Open Source Metascheduling for Virtual Organizations With the Community Scheduler Framework (CSF)", Platform Technical Whitepaper, Aug. 2003, p. 1-13.*

* cited by examiner

*Primary Examiner* — Jennifer To
(74) *Attorney, Agent, or Firm* — Charles L. Moore; Moore & Van Allen PLLC

(57) ABSTRACT

A method, system and computer program product for determining and describing available resources and capabilities to match jobs to endpoints may include applying a set of rules to resource information to at least one of create new resource and attribute information and update existing resource and attribute information. The method may also include applying at least one of the new resource and attribute information and the updated existing resource and attribute information to match jobs to endpoints.

10 Claims, 4 Drawing Sheets

DETERMINING AND DESCRIBING AVAILABLE RESOURCES AND CAPABILITIES TO MATCH JOBS TO ENDPOINTS

BACKGROUND OF THE INVENTION

The present invention relates to job scheduling in a computing environment, and more particularly to a method and system for determining and describing available resources and capabilities in a grid environment or the like to match jobs to available endpoints or resources.

In computing environments that receive multiple jobs to be performed across multiple, shared resources, jobs received by a computing environment are scheduled to match the most appropriate, available resources or endpoints to the different jobs for the most efficient use of the resources and timely completion of the jobs. In such computing environments or scheduling clusters for matching jobs to resources, resources may send their resource attributes to a job scheduler. The resource attributes may include available memory, central processing unit (CPU) type and speed, virtual memory size, physical location as well as other attributes.

A resource request accompanying a job may define the required set of resource attributes to run the job. The job scheduler acts as a broker by matching and ranking a resource offer with a job request, making certain that all requirements are satisfied. After a resource has been matched to a job, the resource is allocated for the period of time that the job is being executed. The allocation is "attribute" based. There are two types of attributes: a consumable attributes and a static attribute. A consumable attribute is consumed by a job in a measurable quantity such as available memory. A static attribute has a static or fixed value or parameter such as operating system type, speed or the like. A resource request associated with a job is expected to provide a quantitative estimate of any consumable attribute the job will require. Each consumable attribute in a resource that may be matched to a job is checked to confirm its existence and availability and each static attribute is checked for the existence. If all the required consumable attributes in a resource are available and all the required static attributes in the resource exist, the resource is considered for allocation and may be allocated to the job request. Once the resource is allocated, the requested amount of consumable attribute is subtracted from the available amount of attribute and will not be available for other jobs until released. If consumable resources are not available at the start time of a job, the job request waits for the resources to be freed by other allocations.

This process of resource matching and allocation works well where resources are homogeneous or have the same or similar application servers, hardware platforms and the like. The job scheduler understands and can evaluate the most appropriate endpoint and resources. As a scheduling cluster becomes more heterogeneous, e.g., different application servers, different hardware platforms, etc., the comparison of resources can no longer be a simple comparison. As scheduling clusters are aggregated, the resource information becomes larger and more heterogeneous by virtue of the different cluster vendors and the different endpoints or resources within them.

BRIEF SUMMARY OF THE INVENTION

In accordance with an embodiment of the present invention, a method for determining and describing available resources and capabilities to match jobs to endpoints may include applying a set of rules to resource information to at least one of create new resource and attribute information and update existing resource and attribute information. The method may also include applying at least one of the new resource and attribute information and the updated existing resource and attribute information to match jobs to endpoints.

In accordance with another embodiment of the present invention, a system for determining and describing available resources and capabilities to match jobs to endpoints may include a database to store a set of rules. The rules may be adapted to at least one of create new resource and attribute information and update existing resource and attribute information. The system may also include a job scheduler to apply at least one of the new resource and attribute information and the updated existing resource and attribute information to match jobs to endpoints.

In accordance with another embodiment of the present invention, a computer program product for determining and describing available resources and capabilities to match jobs to endpoints may include a computer readable medium having computer readable program code embodied therein. The computer readable medium may include computer readable program code configured to apply a set of rules to resource information to at least one of create new resource and attribute information and update existing resource and attribute information. The computer readable medium may also include computer readable program code configured to apply at least one of the new resource and attribute information and the updated existing resource and attribute information to match jobs to endpoints.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
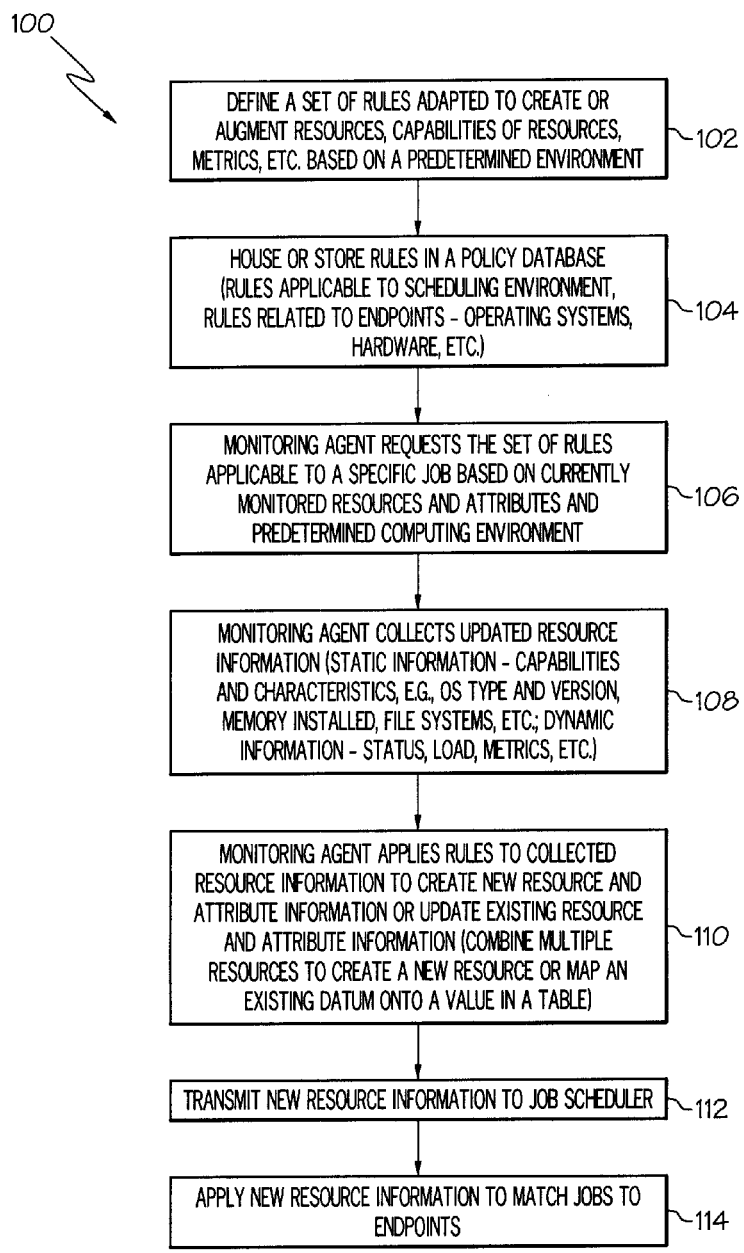
FIG. 1 is a flow chart of an example of a method for determining and describing available resources and capabilities to match jobs to endpoints in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for determining and describing available resources and capabilities to match jobs to endpoints in accordance with an embodiment of the present invention. A job may be a uniquely identifiable task which may involve the execution of one or more processes, computer programs, applications, processing activities or the like. A computing environment may be formed by one or more endpoints or resources. The computing environment or endpoint may be a computer device that hosts one or more resources. An endpoint may be a logical collection of tightly linked computing resources rather than a physical component. Multiple logical partitionings (LPARs) on one mainframe may function as multiple endpoints. A cluster of computers or an Enterprise JavaBeans™ container in a distributed application server installation may function as a single endpoint. Enterprise JavaBeans is a trademark of Sun Microsystems, Inc. in the United States, other countries or both. For the endpoint architecture, computational resource contention boundaries and connectivity boundaries may define the scope of an endpoint.

The computing environment may have attributes that are both static and dynamic. The static attributes may be characteristics and capabilities, such as operating system (OS) type and version, memory installed, file systems or similar characteristics and capabilities. The dynamic attributes may include status of the different components, workload and other metrics that may change from time-to-time depending upon activities of the computing environment.

In block 102, a set of rules may be defined based on a predetermined scheduling or computing environment. There may be two sets of rules or policies. There may be rules that apply to the scheduling environment or computing environment and rules related more specifically to the endpoint or resources associated with an endpoint, such as type of endpoint, operating system, hardware, software and the like. The rules may be adapted to create new resources or augment existing resources, create new or augment capabilities of resources, create new or augment metrics associated with resources and similar attributes related to resources and endpoints. A rule may involve a simple calculation. For example, assume that processor X may be about twice as performant (fast) as processor Y. A rule may be defined to normalize central processor unit (CPU) performance:

Normalized Performance=CPU Performance*Relative Performance

Examples of resources may include memory, disk space, CPU, specific applications or software available, specific hardware available and the like. Examples of resource capabilities or attributes may include type of memory and amount available, type of disk space and amount available, CPU type and speed, operating system type, type of hardware and similar attributes or parameters related to the resources or environment. In block 104, the rules may be stored in a policy database.

In block 106, a monitoring agent may request a set of rules applicable to a specific job based on resources and attributes currently monitored by the monitoring agent and based on a predetermined or target computing environment that may be associated with the monitoring agent. In block 108, the monitoring agent may collect updated information from the resources monitored. The monitoring agent may collect resource load and utilization information by monitoring processing performance and in general, the "health" of the application environment within a computing environment. The information collected may include static information including capabilities and characteristics information, such as OS type and version, memory installed, file systems and the like, and dynamic information, such as status, loading, metrics and similar information that may change from time-to-time depending upon resource activity. This information may be used by a job scheduler to make better decisions about routing activities to optimize resource utilization or to achieve predetermined objectives.

In block 110, the monitoring agent may apply the rules to collected resource information to create new resource and attribute information or update existing resource and attribute information or metrics. Multiple resources may be combined to create a new resource or to map an existing datum onto a value in a table. For example, a given scheduling cluster may have N endpoints each of which may have some amount of memory, M1 ... Mn. The memory associated with the cluster may be summation of M1 ... Mn.

In block 112, the new resource and attribute information or updated resource and attribute information may be transmitted to a job scheduler. In block 114, the new resource information may be utilized by the job scheduler to match jobs to endpoints or resources. The job scheduler may manage jobs and all of the aspects of executing a job from start to finish on a set of target computing environments. The job scheduler may be responsible for orchestrating the set of services, initiating the allocation of resources, interacting with the computing environment or environments, monitoring and logging services and similar or related functions.

Figure 2:
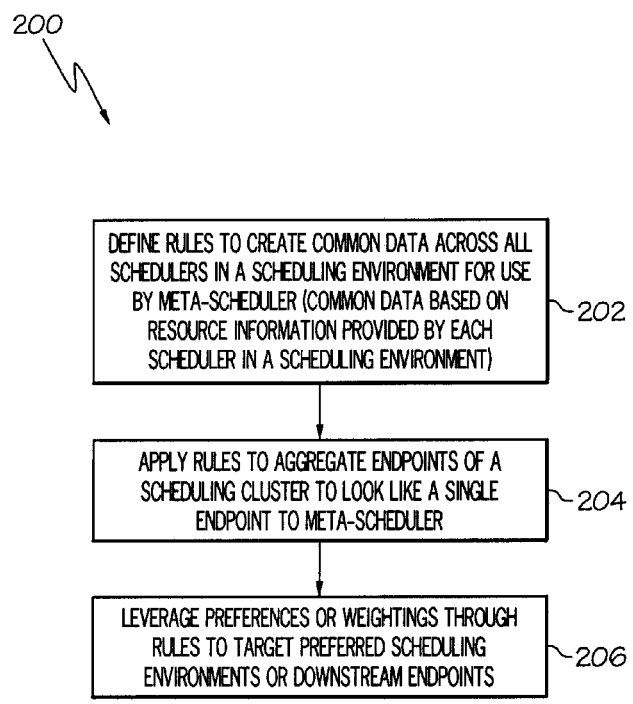
FIG. 2 is a flow chart of an example of a method for determining and describing available resources and capabilities to match jobs to endpoints in accordance with another embodiment of the present invention.

FIG. 2 is a flow chart of an example of a method 200 for determining and describing available resources and capabilities to match jobs to endpoints in accordance with another embodiment of the present invention. In block 202, rules may be defined to create common data across all job schedulers in a scheduling environment for use by a meta-scheduler. The common data may be based on resource information provided by each scheduler in a scheduling environment. Common data or attributes may normally include hardware information and software information. Examples of the hardware information may include physical memory (both used and unused), virtual memory (both used and unused), disk space available and used, CPU type, CPU speed, number of processors, network adapters and the like. Examples of the software information may include operating system type and version, installed software and the like. The meta-scheduler enables federation of heterogeneous application environments and scheduling clusters that may be managed by workload scheduling and management components as described in more detail with respect to FIG. 4. The meta-scheduler may manage scheduling to virtual resources exposed by the backend application environment and may delegate physical distribution of activities to real resources.

In block 204, the rules may be applied to aggregate endpoints of a scheduling cluster to look like a single endpoint to a meta-scheduler. This may simplify the system in permitting allocation of resources or endpoints to jobs that under some circumstances would not normally be matched thereby providing enhanced capacity and efficiency.

In block 206, preferences or weightings may be leveraged through the rules to target preferred scheduling environments or downstream endpoints. Accordingly, some rules may be structured to favor selected environments under some conditions or circumstances.

Figure 3:
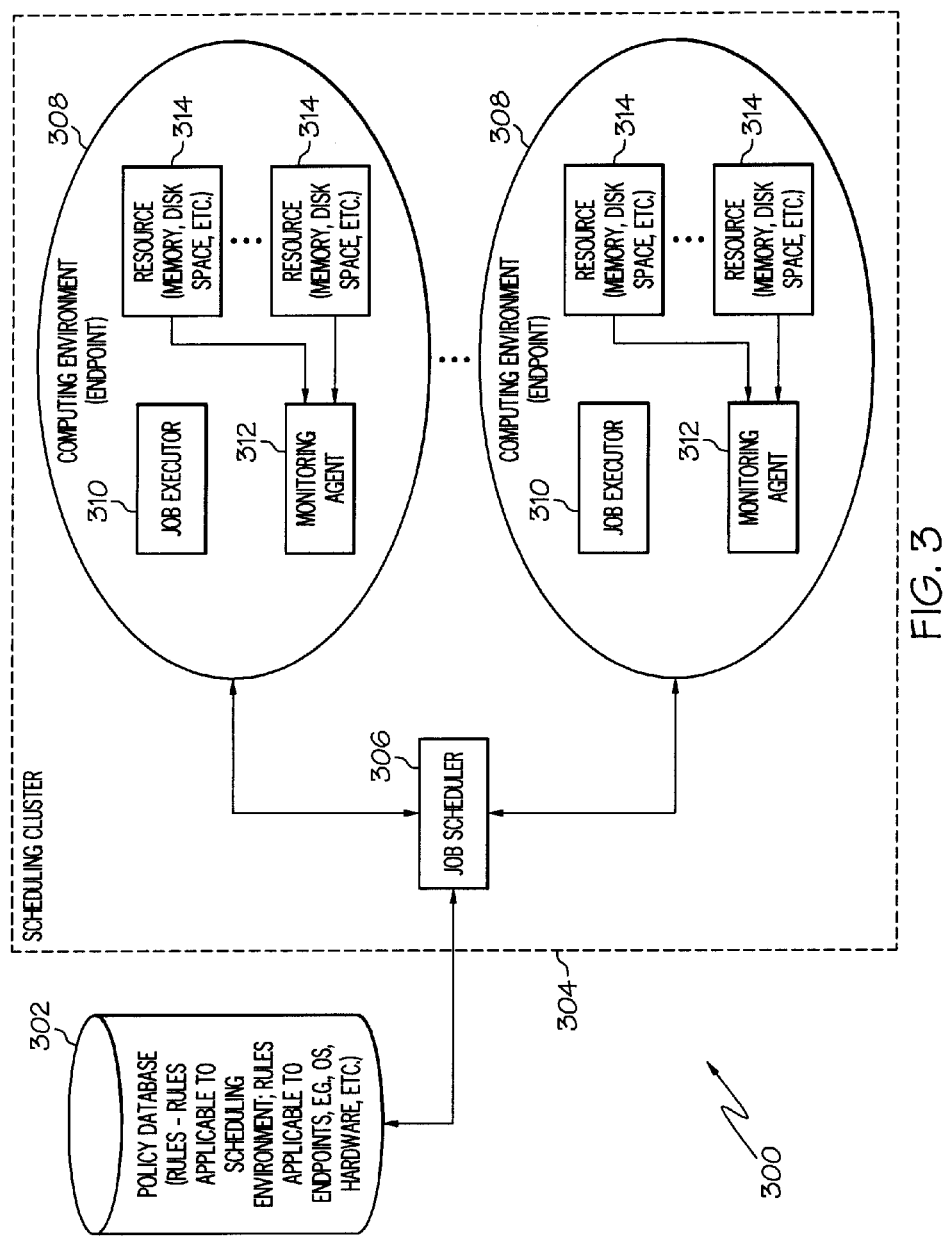
FIG. 3 is a block diagram of an exemplary system for determining and describing available resources and capabilities to match jobs to endpoints in accordance with an embodiment of the present invention.

FIG. 3 is a block diagram of an exemplary system 300 for determining and describing available resources and capabilities to match jobs to endpoints in accordance with an embodiment of the present invention. The system 300 may include a policy database 302. The policy database 302 may store rules applicable to scheduling environments and rules applicable to endpoints, such as operating system types and speeds, hardware or the like similar to that previously described.

The system 300 may also include one or more scheduling clusters 304. Each scheduling cluster 304 may include a job scheduler 306. The job scheduler 306 may be coupled to the policy database 302 to access the rules for matching and allocating resources to jobs. Each scheduling cluster 304 may also include a plurality of computing environments 308 or endpoints. Each computing environment 308 may be connected to the job scheduler to control matching and allocating the different computing environments to jobs based on the rules in the policy database 302.

Each computing environment 308 may include a job executor 310 to carry out the job request and a monitoring agent 312. Similar to that previously described with respect to method 100 of FIG. 1, the monitoring agent 312 may request a set of rules applicable to a specific job based on resources currently being monitored. The monitoring agent 312 may also collect updated resource and attribute information and apply the rules to the collected information similar to that described with respect to blocks 106-110 of method 100 (FIG. 1). The monitoring agent 312 may monitor activities and status of a plurality of resources 314.

Figure 4:
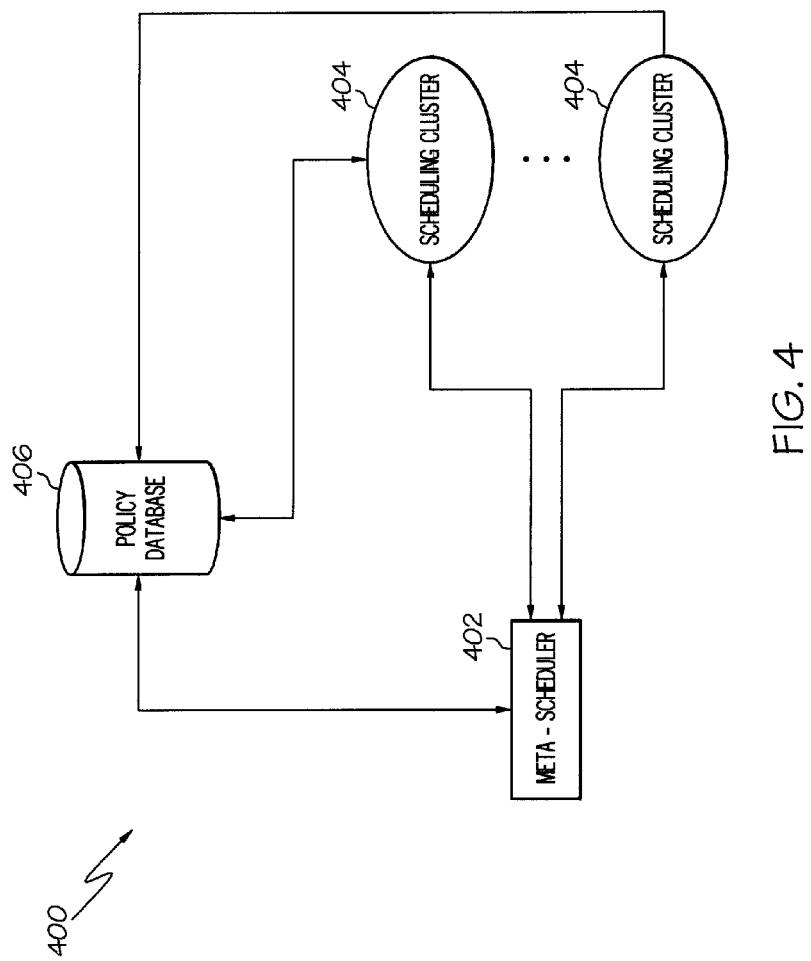
FIG. 4 is a block diagram of an exemplary system for determining and describing available resources and capabilities to match jobs to endpoints in accordance with another embodiment of the present invention.

FIG. 4 is a block diagram of an exemplary system 400 for determining and describing available resources and capabilities to match jobs to endpoints in accordance with another embodiment of the present invention. The system 400 may include a meta-scheduler 402. Similar to that previously described, the meta-scheduler 402 may enable federation of heterogeneous application environments and different scheduling clusters 404. The meta-scheduler 402 may manage the scheduling of multiple resources. The scheduling clusters 404 may be similar to scheduling clusters 308 in FIG. 3. The system 400 may also include a policy database 406 for storing rules. The policy database 406 may be the same as database 302 in FIG. 3. The meta-scheduler 402 may be connected to the policy database 406 and to each of the scheduling clusters 404 to manage and allocate jobs to the different scheduling clusters based on the rules from the policy database based on the particular job and the scheduling clusters 404 that may be used.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for determining and describing available resources and capabilities to match jobs to endpoints, comprising:
   defining a set of rules, by a computer, to create new resources, augment existing resources, create new capabilities of resources, and create metrics based on a predetermined computing environment;
   requesting the set of rules, by a monitoring agent running on the computer, applicable to a specific job based on resources and attributes currently monitored by the monitoring agent;
   leveraging preferences through the set of rules to target at least one of a preferred scheduling environment and a group of endpoints;
   applying the set of rules by the monitoring agent to resource information to at least one of create new resource and attribute information and update existing resource and attribute information;
   transmitting at least one of the new resource and attribute information and the updated existing resource and attribute information to a job scheduler for applying the information to match the job to an endpoint; and
   applying at least one of the new resource and attribute information and the updated existing resource and attribute information to match the job to the endpoint by the job scheduler.

2. The method of claim 1, further comprising collecting the resource information to apply the set of rules.

3. The method of claim 1, wherein applying the set of rules comprises applying the rules to aggregate a plurality of endpoints of a scheduling cluster to look like a single endpoint to a meta-scheduler.

4. The method of claim 1, wherein a meta-scheduler enables federation of heterogeneous computing environments and different scheduling clusters to manage scheduling of multiple resources distributed in the different scheduling clusters.

5. A system for determining and describing available resources and capabilities to match jobs to endpoints, comprising:
   a plurality of scheduling clusters, each scheduling cluster comprising:
      a plurality of different computing environments, wherein each computing environment comprises:
      a computer;
      a policy database residing on the computer, the policy database storing a set of rules to create new resources, augment existing resources, create new capabilities of resources, and create metrics based on the plurality of computing environments;
      a monitoring agent running on the computer to request the set of rules applicable to a specific job based on resources and attributes currently monitored by the monitoring agent, the monitoring agent being adapted to apply the requested set of rules to resource information to at least one of create new resource and attribute information and update existing resource and attribute information, and to leverage preferences through the set of rules to target at least one of a preferred scheduling environment and a group of endpoints; and
   a job scheduler connected to each of the plurality of different computing environments to control matching and allocating of each of the different computing environments to a respective job based on the set of rules received from each monitoring agent, the job scheduler being adapted to apply at least one of the new resource and attribute information and the updated existing resource and attribute information to match jobs to endpoints or computing environments.

6. The system of claim 5, wherein the monitoring agent is configured to collect resource information and to apply the set of rules applicable to the specific job to the collected resource information to create at least one of the new resource and attribute information and the updated existing resource and attribute information.

7. The system of claim 6, wherein the monitoring agent transmits at least one of the new resource and attribute information and the updated resource and attribute information to the job scheduler.

8. A computer program product for determining and describing available resources and capabilities to match jobs to endpoints, the computer program product comprising:
   a nontransitory computer usable storage medium having computer readable program code embodied therein, the computer usable storage medium comprising:
      computer readable program code configured to define a set of rules, by a computer, to create new resources, augment existing resources, create new capabilities of resources, and create metrics based on a predetermined computing environment;
      computer readable program code configured to request a set of rules, by a monitoring agent running on a computer, applicable to a specific job based on resources and attributes currently monitored by the monitoring agent;
      computer readable program code configured to leverage preferences through the set of rules to target at least one of a preferred scheduling environment and a group of endpoints;
      computer readable program code configured to apply the set of rules, by a monitoring agent, to resource information to at least one of create new resource and attribute information and update existing resource and attribute information, wherein the monitoring agent is directly connected to the resources currently monitored by the monitoring agent;

computer readable program code configured to transmit at least one of the new resource and attribute information and the updated existing resource and attribute information to a job scheduler for applying the information to match the job to an endpoint; and computer readable program code configured to apply at least one of the new resource and attribute information and the updated existing resource and attribute information to match the job to the endpoint by the job scheduler.

9. The computer program product of claim 8, further comprising computer readable program code configured to collect the resource information to apply the set of rules.

10. The computer program product of claim 8, further comprising computer readable program code configured to apply the rules to aggregate a plurality of endpoints of a scheduling cluster to look like a single endpoint to a meta-scheduler.

* * * * *